United States Patent
Varga et al.

(10) Patent No.: US 11,472,120 B2
(45) Date of Patent: Oct. 18, 2022

(54) LIGHT-BASED 3D PRINTING

(71) Applicant: Kyndryl, Inc., New York, NY (US)

(72) Inventors: Sergio Varga, Campinas (BR); Sarbajit K. Rakshit, Kolkata (IN); Daniela Trevisan, Porto Alegre (BR)

(73) Assignee: Kyndryl, Inc., New York, NY (US)

( * ) Notice: Subject to any disclaimer, the term of this patent is extended or adjusted under 35 U.S.C. 154(b) by 224 days.

(21) Appl. No.: 16/868,889

(22) Filed: May 7, 2020

(65) Prior Publication Data
US 2021/0347125 A1 Nov. 11, 2021

(51) Int. Cl.
*B29C 64/393* (2017.01)
*B33Y 50/02* (2015.01)
*B33Y 30/00* (2015.01)
*B29C 64/264* (2017.01)
*B33Y 10/00* (2015.01)
*B29C 64/135* (2017.01)

(52) U.S. Cl.
CPC .......... *B29C 64/393* (2017.08); *B29C 64/135* (2017.08); *B29C 64/264* (2017.08); *B33Y 10/00* (2014.12); *B33Y 30/00* (2014.12); *B33Y 50/02* (2014.12)

(58) Field of Classification Search
CPC ... B29C 64/393; B29C 64/135; B29C 64/264; B29C 64/106; B33Y 10/00; B33Y 30/00; B33Y 50/02
See application file for complete search history.

(56) References Cited

U.S. PATENT DOCUMENTS

| 5,046,792 A | 9/1991 | Zabka |
| 6,803,938 B2 | 10/2004 | Turner |
(Continued)

FOREIGN PATENT DOCUMENTS

| CN | 103978307 A | 8/2014 |
| CN | 104325641 A | 2/2015 |
(Continued)

OTHER PUBLICATIONS

Unknown, "3D Printers and 3D Printing: Technologies, Processes and Techniques", Sculpteo, printed Apr. 3, 2020, 10 pages, <https://www.sculpteo.com/en/3d-printing/3d-printing-technologies/>.

(Continued)

*Primary Examiner* — Niki Bakhtiari
*Assistant Examiner* — Inja Song
(74) *Attorney, Agent, or Firm* — Ken Han, Esq.; Kevin P. Radigan, Esq.; Heslin Rothenberg Farley & Mesiti, P.C.

(57) ABSTRACT

Aspects of the present disclosure relate to light-based 3D printing. A computer aided design (CAD) representation of an object is obtained. Mirror and lighting requirements of a light-based 3D printer containing at least one mirror and at least one light source are determined based on the CAD representation of the object. Mirror and lighting characteristics of the at least one mirror and the at least one light source are adjusted based on the determined mirror and lighting requirements, the adjusting resulting in a first 3D light-based printer configuration. A 3D printing process is then initiated, wherein initiating the 3D printing process includes exposing a photosensitive material within the light-based 3D printer to light based on the first light-based 3D printer configuration.

10 Claims, 7 Drawing Sheets

(56) References Cited

U.S. PATENT DOCUMENTS

| | | | |
|---|---|---|---|
| 9,561,624 B1 | 2/2017 | Wu | |
| 9,956,727 B2 | 5/2018 | Steele | |
| 2003/0210323 A1* | 11/2003 | Turner | G02B 26/0833 |
| | | | 347/231 |
| 2015/0367419 A1 | 12/2015 | Buller et al. | |
| 2016/0107380 A1 | 4/2016 | Smoot et al. | |
| 2017/0232668 A1* | 8/2017 | Shen | B29C 64/277 |
| | | | 425/174.4 |
| 2018/0001581 A1* | 1/2018 | Patel | B29D 11/00961 |
| 2018/0186081 A1 | 7/2018 | Milshtein et al. | |
| 2018/0188684 A1* | 7/2018 | Mullins | G03H 1/0005 |
| 2018/0326666 A1* | 11/2018 | Kelly | B29C 64/241 |
| 2019/0022941 A1* | 1/2019 | Wu | B29C 64/135 |
| 2019/0070777 A1* | 3/2019 | Wu | B33Y 10/00 |
| 2019/0240906 A1* | 8/2019 | Zeulner | B33Y 30/00 |
| 2020/0055253 A1 | 2/2020 | Knorr et al. | |
| 2020/0298471 A1* | 9/2020 | Medalsy | B29C 64/124 |

FOREIGN PATENT DOCUMENTS

| | | |
|---|---|---|
| CN | 204526174 U | 8/2015 |
| CN | 108312518 A | 7/2018 |
| EP | 0724494 B1 | 6/1998 |
| KR | 1020190113844 A | 10/2019 |
| WO | 2015197794 A1 | 12/2015 |
| WO | 2016179661 A1 | 11/2016 |

OTHER PUBLICATIONS

Groth et al., "Overview Three-Dimensional Printing Technology", JCO, Inc., vol. XLVIII No. 8, pp. 475-485, Aug. 2014.

Xiong et al., "Photoresponsive Polymer", Smart Polymers and their Applications (Second Edition), ScienceDirect, 17 pages, 2019.

Bertrand et al., "Photo-responsive polymers: synthesis and applications", Abstract Only, Polymer Chemistry, 2017, 5 pages, <https://pubs.rsc.org/en/content/articlelanding/2017/py/c6py01082b#!divAbstract>.

Harvey, L., "From Hologram to Reality, 3D Printing with Light" Blogs from MathWorks®, The MathWorks, Inc., Jun. 20, 2019, 3 pages <https://blogs.mathworks.com/headlines/2019/06/20/from-hologram-to-reality-3d-printing-with-light/>.

Coldewey, D., "Holography-based 3D printing produces objects in seconds instead of hours", Dec. 9, 2017, 9 pages <https://techcrunch.com/2017/12/08/holography-based-3d-printing-produces-objects-in-seconds-instead-of-hours/>.

Coxworth, B., "New 3D-printing tech gets smooth results using light and resin" New Atlas, pp. 1-8, Feb. 1, 2019,< https://newatlas.com/resin-light-3d-printing/58301/>.

Unknown, "Reflection of Light", Science Learning Hub, 8 pages, 2012 <https://www.sciencelearn.org.nz/resources/48-reflection-of-light>.

Wikipedia, "One-way mirror", From Wikipedia, the free encyclopedia, last edited on Apr. 6, 2020, printed Apr. 6, 2020, 3 pages, <https://en.wikipedia.org/wiki/One-way_mirror>.

Well et al., "The NIST Definition of Cloud Computing", Recommendations of the National Institute of Standards and Technology, Sep. 2011, 7 pages.

* cited by examiner

LIGHT-BASED 3D PRINTING

BACKGROUND

The present disclosure relates generally to the field of 3D printing, and in particular, to light-based 3D printing.

3D printing is a process in which an object is physically constructed, typically by successively adding material layer by layer, based on a 3D model (e.g., a computer-aided design (CAD) model). A 3D printing process typically includes modeling (e.g., generating the size/shape of the object in computer software), printing (e.g., additive manufacturing based on the model), and finishing (e.g., sanding and painting the printed object). As advancements in field of 3D printing are made, more complex materials are able to be constructed, including microelectronics (e.g., multi-material printing), tissues (e.g., bioprinting), and foods, to name a few. Additive manufacturing technologies currently meet fabrication needs in applications including medical devices, optics, microfluidics, aerospace components, fixturing, tooling, and others.

SUMMARY

Aspects of the present disclosure relate to a method, system, and computer program product for light-based 3D printing. A computer aided design (CAD) representation of an object can be obtained. Mirror and lighting requirements of a light-based 3D printer containing at least one mirror and at least one light source can be determined based on the CAD representation of the object. Mirror and lighting characteristics of the at least one mirror and the at least one light source can be adjusted based on the determined mirror and lighting requirements, the adjusting resulting in a first 3D light-based printer configuration. A 3D printing process can then be initiated, wherein initiating the 3D printing process includes exposing a photosensitive material within the light-based 3D printer to light based on the first light-based 3D printer configuration.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of 3D printing, and more particularly to light-based 3D printing. While the present disclosure is not necessarily limited to such applications, various aspects of the disclosure may be appreciated through a discussion of various examples using this context.

3D printing is a process in which an object is physically constructed, typically by successively adding material layer by layer, based on a 3D model (e.g., a computer-aided design (CAD) model). A 3D printing process can include modeling (e.g., generating the size/shape of the object in computer software), printing (e.g., additive manufacturing based on the model), and finishing (e.g., sanding and painting the printed object). As advancements in field of 3D printing are made, more complex materials are able to be constructed, including microelectronics (e.g., multi-material printing), tissues (e.g., bioprinting), and foods, to name a few. Additive manufacturing technologies currently meet fabrication needs in applications including medical devices, optics, microfluidics, aerospace components, fixturing, tooling, and others.

Light-based 3D printing is an emerging field in which photosensitive materials are used for 3D printing. During a light-based 3D printing process, photosensitive materials are subject to light-induced changes which alter the physical properties (e.g., shape, wettability, solubility, optical properties, conductivity, adhesion, and others) thereof. This can lead to the photosensitive material polymerizing, solidifying, precipitating or otherwise forming into a solid object with a specific size and shape based on the manner in which the material was subjected to light-induced changes.

Light-based 3D printing has distinct advantages compared to other methods for 3D printing (e.g., fused deposition modeling). For example, light-based 3D printing does not require contact. This can remove the need to replace parts within the system resulting from wear and tear, remove contamination concerns, and reduce the amount of moving parts within the system. Additionally, light-based 3D printing does not require printing layer-by-layer as most conventional 3D printing techniques do. Rather, light-based 3D printing can fully form an object based on light-induced changes made to the photosensitive material. This can reduce the amount of time required for printing and result in smoother objects. Ultimately, the layer-by-layer approach can limit throughput, degrade surface quality, limit geometric capabilities, increase postprocessing requirements, and degrade performance.

Aspects of the present disclosure relate to light-based 3D printing. A computer aided design (CAD) representation of an object can be obtained. Mirror and lighting requirements of a light-based 3D printer containing at least one mirror and at least one light source can be determined based on the CAD representation of the object. Mirror and lighting characteristics of the at least one mirror and the at least one light source can be adjusted based on the determined mirror and lighting requirements, the adjusting resulting in a first 3D light-based printer configuration. A 3D printing process can then be initiated, wherein initiating the 3D printing process includes exposing a photosensitive material within the light-based 3D printer to light based on the first light-based 3D printer configuration.

Figure 1:
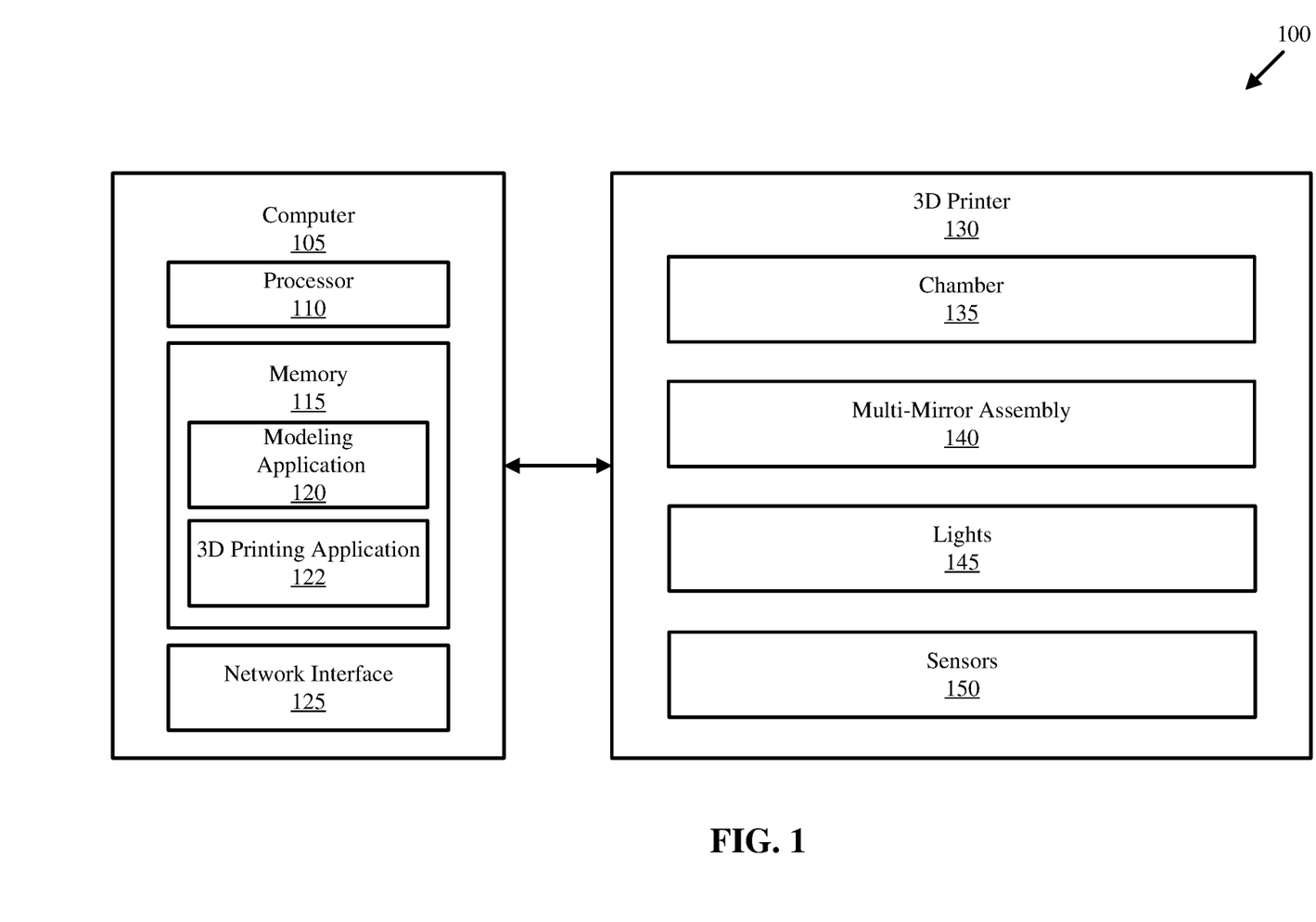
FIG. 1 is block diagram illustrating an example 3D printing system, in accordance with embodiments of the present disclosure.

Referring now to FIG. 1, shown is a 3D printing system 100 including a 3D printer 130 communicatively coupled to a computer 105, in accordance with embodiments of the present disclosure. In embodiments, the computer 105 (and the components thereof) may be integrated within the 3D printer 130. However, in some embodiments, the 3D printer 130 may be physically separated from (e.g., remotely accessible or locally proximate to) the computer 105 and communicatively coupled to the 3D printer 130 through a network interface 125 using any suitable connection (e.g., a wired or wireless connection).

The 3D printer 130 can be configured to receive requests from the computer 105. The computer 105 includes a processor 110 configured to execute instructions stored in a memory 115. The processor 110 can be configured to execute any of the described functionalities herein (e.g., functionalities performed by applications in memory 115). The memory 115 includes a modeling application 120 configured to generate models, receive models, modify models, analyze models, or otherwise handle the modeling of objects to be printed within the 3D printer 130. The modeling application 120 can be any suitable computer aided design (CAD) application configured to model objects. For example, the modeling application 120 can be configured to produce detailed 2D or 3D engineering designs, create conceptual designs, and generate reports, among other functions. The memory 115 also includes a 3D printing application 122 configured to facilitate the generation of an object based on the model output by the modeling application 120. This can be completed by issuing commands to reconfigure components within the 3D printer 130.

The 3D printer 130 includes a chamber 135, a multi-mirror assembly 140, light sources 145, and sensors 150. The chamber 135 can be configured to house the components of the 3D printer 130. In particular, the chamber 135 can be configured to house a photosensitive material (not shown), the multi-mirror assembly 140, the light sources 145, and the sensors 150. In embodiments, at least a portion of the chamber 135 (e.g., a fluid container within the chamber) can be configured to retain a photosensitive material.

The multi-mirror assembly 140 is configured to redirect light emitted from light sources 145 within the chamber 135. This can be completed such that the photosensitive material within the chamber 135 is exposed to light in a controlled manner, resulting in light-induced changes that facilitate the forming of an object based on the controlled light exposure. The multi-mirror assembly 140 can include one or more mirrors and one or more actuators coupled to respective mirrors. The actuators can be configured to reposition the mirrors upon receiving a control signal from the computer 105. The actuators can operate using any suitable mechanism such that the mirrors of the multi-mirror assembly 140 can be accurately repositioned within the chamber 135. The actuators can be hydraulic, pneumatic, mechanical, thermal, magnetic, piezoelectric, etc. Repositioning a mirror can include changing a location, angle, or height of a mirror within the chamber.

The light sources 145 can be configured to emit light such that a photosensitive material residing in the chamber can undergo a light-induced change. The number, position, frequency, and intensity of light sources 145 within the chamber 135 can vary. In some embodiments, the frequency (e.g., wavelength) and intensity (e.g., brightness) of light sources 145 can depend on the type of photosensitive material used in the chamber 135. For example, a particular photosensitive material can include a functional group which reacts with light under particular frequency and intensity conditions. Thus, the selected frequency and intensity of light sources 145 within the system can depend on the properties of the photosensitive material. In embodiments, the position of light sources 145, number of active light sources 145, frequency of light sources 145, angle of light sources 145, and intensity of light sources 145 can be dynamically adjusted in between or during 3D printing processes in response to control signals issued by the computer 105. Thus, light sources 145 can also be coupled to one or more actuators.

Sensors 150 can be configured to collect sensor data within the chamber 135 of the 3D printing system 100. In embodiments, sensors 150 include optical sensors configured to measure light frequency and intensity at various points within the chamber 135. In embodiments, sensors 150 include positional sensors configured to detect the position of mirrors and lights 145 within the chamber 135. Positional and optical sensor data can be used to issue control signals to the lights 145 and multi-mirror assembly 140 by the computer 105 such that accurate light exposure can be attained during 3D printing processes. In embodiments, sensors 150 include pH, temperature, concentration, or other types of sensors configured to measure properties of the photosensitive material (e.g., a solution/fluid containing the photosensitive material). Sensor data regarding the photosensitive material can be used for accurate formulation of the fluid containing the photosensitive material. Further, sensor data regarding the photosensitive material can be used to ensure the conditions are proper for 3D printing (e.g., the photosensitive material is at the proper temperature, concentration, pH, etc. required for a light-based 3D printing process).

The 3D printing application 122 can be configured to issue control signals (e.g., to actuators) to reconfigure components within the 3D printer 130. For example, the 3D printing application 122 can issue a control signal to actuators of the multi-mirror assembly 140 and/or lights 145 such that the 3D printer 130 rearranges into a desired configuration. The configuration can dictate light exposure to the photosensitive material. Thus, the 3D printing application 122 calculates a desired configuration of components (e.g., the multi-mirror assembly 140 and light sources 145) within the 3D printer 130 necessary to facilitate the forming of the object with a particular size and shape based on required light exposure. In embodiments, the 3D printing application 122 can determine a desired configuration based on a model received from the modeling application 120. In some embodiments, the 3D printing application 122 can determine a desired configuration based on sensor data received from sensors 150.

In embodiments, the 3D printing application 122 can determine that multiple configurations of the 3D printer 130 are necessary to facilitate the forming of an object. Thus, the 3D printing application 122 can iteratively form an object. For example, a first configuration of the 3D printer 130 can be used to print a first portion (e.g., an inner shell) of an object and a second configuration of the 3D printer 130 can be used to print a second portion (e.g., an outer shell) of an object.

It is noted that FIG. 1 is intended to depict the representative major components of an example 3D printing system 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a 3D printing system 100 with a single computer 105, suitable computing environments for implementing embodiments of this disclosure can include any number of computers 105. The various models, modules, systems, and components illustrated in FIG. 1 can exist, if at all, across a plurality of computers. For example, some embodiments can include two computers (e.g., a computer integrated within the 3D printer 130 and a separate computer communicatively coupled to the 3D printer 130). The two computers can be communicatively coupled using any suitable communications connection (e.g., using a WAN, a LAN, a wired connection, an intranet, or the Internet).

Figure 2:
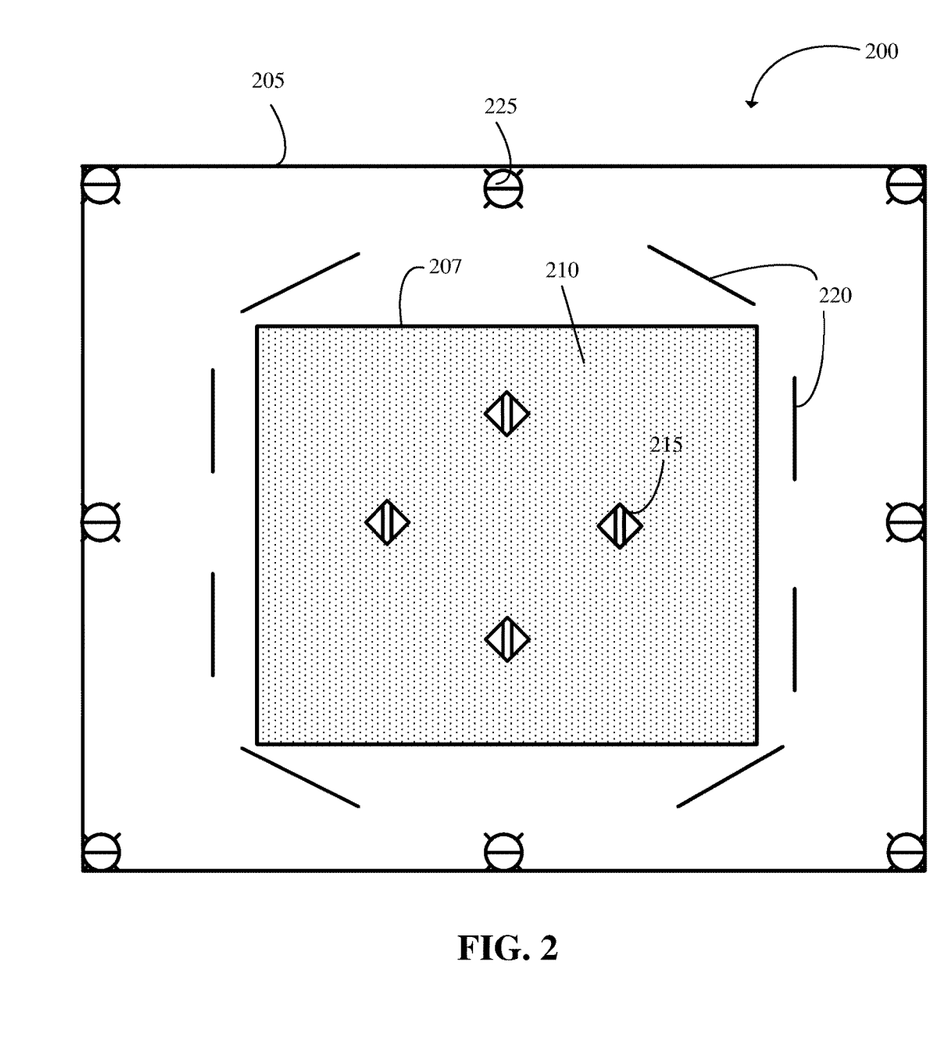
FIG. 2 is a block diagram illustrating an example 3D printer configuration, in accordance with embodiments of the present disclosure.

Referring now to FIG. 2, shown is a top-down view of an example 3D printer 200 configuration, in accordance with embodiments of the present disclosure. The 3D printer 200 includes a chamber 205, a fluid container 207, a photosensitive material 210, sensors 215, mirrors 220, and light sources 225. In embodiments, the components described in FIG. 2 can be the same as, or substantially similar to corresponding components described with respect to FIG. 1.

The size and shape of the chamber 205 can vary. For example, the chamber 205 can be large (e.g., 1 m×1 m×1 m), mid-size (e.g., 250 mm×250 mm×250 mm), or small (e.g., 100 mm×100 mm×100 mm). In embodiments, the size and/or shape of the chamber 205 can be fixed or adjustable. For example, the chamber 205 can have a first size and shape during a first 3D printing process and thereafter be adjusted to have a second size and shape during a second 3D printing process. This can be implemented to accommodate the printing of objects of a variety of shapes and sizes. In embodiments, the chamber 205 can be partitioned or otherwise adjusted into sub-chambers to accommodate the printing of multiple objects or multiple portions of the same object simultaneously within the 3D printer 200.

The fluid container 207 of the chamber 205 can be configured to receive and retain a fluid. The fluid container 207 can include a fluid inlet and a fluid outlet such that a liquid can be added to and/or removed from the fluid container 207. The fluid container 207 can include proper sealing such that the fluid does not escape the fluid container 207. In embodiments, the fluid filled within the fluid container 207 includes the photosensitive material 210.

The photosensitive material 210 can be any suitable material which can undergo light-induced changes such that the photosensitive material 210 solidifies, polymerizes, precipitates, or otherwise transitions from a fluid into a solid object. Examples of photosensitive materials that may be suitable for light-based printing include polymers containing azobenzene and spiropyran functional groups. Photosensitive materials 210 can include, without limitation, nitrobenzyl and dithiodipropionic acid polyetherimide, poly-N-isoproplyacrylamide-spiropyran, poly[N-isopropylacrylamide-b-sodium 2-(acrylamido)-2-methylpropane sulfonate], poly(ethylene oxide-methacrylate) with pyrene pedant, gelatin methacrylate (GelMA) hydrogel, and others.

In embodiments, the photosensitive material 210 may require preparation prior to or after addition to the fluid container 207. For example, in some embodiments, the photosensitive material 210 may require particular temperature or pH conditions prior to light-based 3D printing. Thus, in embodiments, the fluid container 207 can be constructed to withstand particular temperature and/or pH conditions. In embodiments, the fluid container 207 can include a heating element (not shown) configured to alter a temperature of fluid within the fluid container 207. This can facilitate the catalysis of light-based reactions and/or the forming of gel suspensions within the fluid container 207.

As depicted in FIG. 2, the light sources 225 are arranged along the perimeter of the chamber 205 such that light can be directed into the fluid container 207. Light sources 225 can be directed toward particular mirrors 220 or portions of the photosensitive material 210 in a controlled manner. However, in embodiments, light sources 225 can be disposed within the fluid container 207, along the perimeter of the fluid container 207, or in any other suitable location within the chamber 205.

The light sources 225 can be adjusted such that controlled light exposure to the photosensitive material 210 within the fluid container 207 can be attained. For example, the position of the light sources 225, direction of the light sources 225, intensity of the light sources 225, frequency of the light sources 225, width of the light sources 225 (e.g., beam diameter), and number of active light sources 225 can be controlled before, during, or after a 3D printing process. This can be completed based on control signals received from a computer system (e.g., based on calculations made by 3D printing application 122). Thus, the light sources 225 can include actuators configured to adjust the position of light sources 225 (e.g., to reposition the light sources vertically or horizontally within the chamber 205), direction of light sources 225 (e.g., to rotate the light sources), intensity of the light sources 225 (e.g., to increase or reduce the power provided to the light sources), frequency of light sources 225 (e.g., to increase or reduce the wavelength of the light sources), width of light sources 225 (e.g., to widen or narrow a slit the light is emitted from), and/or number of active light sources 225 (e.g., to toggle specific light sources on and off using a switch). As discussed herein, "lighting requirements" to facilitate the printing of an object refers to the configuration (e.g., position, angle, intensity, frequency, etc.) of light sources 225 necessary to attain light exposure such that an object of a particular size and shape can be printed.

Similarly, as depicted in FIG. 2, the mirrors 220 are arranged around the fluid container 207 within the chamber 205. The mirrors 220 can be configured to redirect light emitted by light sources 225 such that specific portions of the photosensitive material 210 are exposed to light. Though the mirrors 220 are shown as encompassing the fluid container 207, in embodiments, the mirrors 220 can be placed within the fluid container 207, along the perimeter of the fluid container 207, along the perimeter of the chamber 205, or any other suitable location within 3D printer 200.

The mirrors 220 can also be adjusted such that controlled light exposure to the photosensitive material 210 can be attained. For example, the position of mirrors 220, angle of mirrors 220, number of mirrors 220, and type of mirrors 220 can be adjusted within the 3D printer 200. Thus, actuators associated with mirrors 220 can be configured to receive control signals such that the position, angle, number, and/or type of mirrors 220 can be adjusted. The size and shape of the mirrors can vary. For example, the mirrors can be planar, concave, or convex, depending on the requirements of the 3D printer 200. As discussed herein "mirror requirements" to facilitate the printing of an object refers to the configuration (e.g., position, number, angle, type, etc.) of mirrors necessary to attain light exposure such that an object of a particular size and shape can be printed.

Though not shown in FIGS. 1-2, in embodiments, lenses can be incorporated within the 3D printer 200 to provide further control of the light exposure to the photosensitive material. For example, one or more lenses can be configured to disperse or condense light in particular areas of the 3D printer 200. The number, type (e.g., concave vs. convex), and placement of lenses can vary within the system based on printing requirements.

As shown in FIG. 2, sensors 215 can be disposed within the fluid container 207. In embodiments, the sensors 215 can be configured to measure characteristics (e.g., pH, temperature, concentration, conductivity, etc.) of a fluid within the fluid container 207. This can be used for accurate formulation of the fluid containing the photosensitive material 210. Further, measuring characteristics of the fluid can aid in ensuring the conditions (e.g., temperature, concentration, pH) are proper for light-based 3D printing. In embodiments, if the conditions are not proper according to a sensor value (e.g., a sensor value falls below or exceeds a particular threshold), a warning or action can be issued by a computer system coupled to the sensors 215.

In embodiments, sensors 215 can be used to measure light within the fluid container 207. This can be completed such that light characteristics (e.g., number, type, frequency, intensity, position, angle, etc.) and/or mirror characteristics (e.g., number, type, position, angle, etc.) can be altered based on the sensor readings. For example, in response to an intensity of light measured by an optical sensor within the fluid container 207 falling below or exceeding a threshold, an adjustment can be made to the number of active lights (e.g., a light can be turned off or on), the angle of a light, the position of a light, the width of a light, the frequency of a light, etc. Similarly, in response to an intensity of light measured by an optical sensor within the fluid container 207 falling below or exceeding a threshold, an adjustment can be made to the number of mirrors 220, an angle of a mirror, a position of a mirror, etc.

Though FIG. 2 depicts sensors 215 within the fluid container 207, in embodiments, sensors 215 can be located in any suitable location. For example, sensors can be located outside of the fluid chamber 205. Further, any suitable number and/or type of sensors 215 can be implemented.

With respect to control signals issued to adjust actuators within the 3D printer 200, in embodiments, control signals issued by a computer system coupled to the 3D printer 200 can be completed using proportional-integral-derivative (PID) control. That is, control can be based on proportional, integral, or derivative algorithms.

It is noted that FIG. 2 is intended to depict an example 3D printer 200 configuration. In other configurations, individual components can have greater or lesser complexity than as represented in FIG. 2, components other than or in addition to those shown in FIG. 2 can be present, and the number, type, and configuration of such components can vary.

Figure 3:
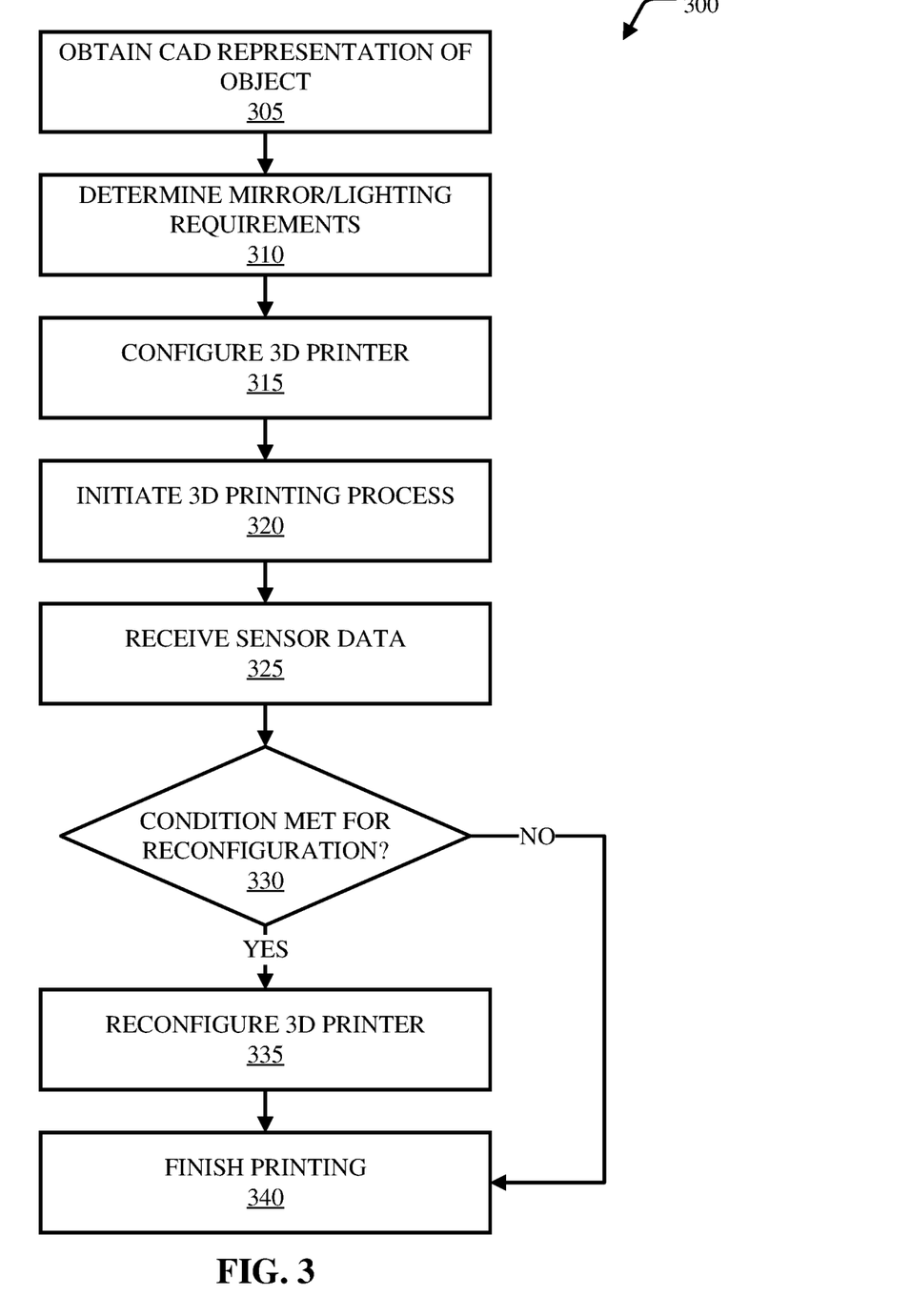
FIG. 3 is a flow-diagram illustrating an example method for light-based 3D printing, in accordance with embodiments of the present disclosure.

Referring now to FIG. 3, shown is an example method 300 for light-based 3D printing, in accordance with embodiments of the present disclosure. Operations described in FIG. 3 can be completed by one or more processing circuits of a computer system and/or 3D printer (e.g., computer 105, 3D printer 130, and 3D printer 200).

Method 300 initiates at operation 305, where a computer aided design (CAD) representation of an object is obtained. The CAD representation of the object can be generated or received by a modeling application (e.g., modeling application 120 of FIG. 1) configured to handle the modeling of 3D objects. The CAD representation of the object can include details pertaining to the size and shape of the object. In some embodiments, additional data relating to the material(s) the object is constructed from, the proposed color(s) of the object, and whether any external parts (e.g., bearings, a circuit board, etc.) are required for the fabrication of the object can be included within the CAD representation.

Lighting and mirror requirements (e.g., a desired 3D printer configuration) necessary to facilitate the forming of the CAD object are then determined. This is illustrated at operation 310. Determining the mirror and lighting requirements can be completed by modeling the travel of light throughout the 3D printer (e.g., in an application such as 3D printing application 122). For example, modeling can include, without limitation, modeling light propagation through the photosensitive material, modeling reflection off one or more mirrors, and modeling light dispersion or focus caused by one or more lenses. Thus, modeling can include defining the position, intensity, frequency, and/or direction of light sources, defining the angle, type, and/or position of one or more mirrors, defining the refractive index of the photosensitive material, defining the angle, characteristics, and/or position of one or more lenses, etc. Modeling can occur until a suitable configuration for generating the size and shape of the object is identified.

For example, to facilitate the formation of a "star" shape, five mirrors may be required to be uniformly placed around the perimeter of the photosensitive material with a single light source. As another example, for the formation of a "square" share, four mirrors may be required to be placed in respective corners around the perimeter of the photosensitive material with a single light source. However, advanced modeling can facilitate the determination of configurations necessary to form an object of any given size and shape. In some embodiments, a user can set modeling variables (e.g., mirror and lighting characteristics) such that the user can attempt to generate the size and/or shape of the object.

The 3D printer is then configured based on the determined mirror and/or lighting requirements. This is illustrated at operation 315. Configuring the 3D printer at operation 315 can include issuing control signals to actuators associated with lights and/or mirrors such that a desired configuration is achieved. For example, control signals can be issued to adjust the number, type, frequency, intensity, position, and angle of lights within the 3D printer. Similarly, control signals can be issued to adjust the number, type, position, and angle of mirrors within the 3D printer. In some embodiments, manual intervention can be implemented to aid in achieving the desired configuration. In some embodiments, one or more lenses can be positioned within the system.

The 3D printing process then initiates at operation 320. Initiating the 3D printing process can include powering on the light source(s) within the 3D printer. Power can be provided to the lights for any suitable time period, and may depend on the time required for the photosensitive material to undergo light-induced changes.

Sensor data within the 3D printing chamber is then received. This is illustrated at operation 325. Sensor data can include any sensor data described with respect to sensors 150 of FIG. 1 and/or sensors 215 of FIG. 2. For example, sensor data can include optical data (e.g., the intensity or frequency of light passing through the photosensitive material), positional data (e.g., the position or angle of mirrors/lights within the 3D printer, the proximity of mirrors and/or lenses to each other, etc.), temperature data, pH data, and others.

A determination is made whether a condition for reconfiguring the 3D printer based on the sensor data is met. This is illustrated at operation 330. In embodiments, one or more sensor value thresholds can be implemented such that if a particular sensor value exceeds or falls below a given threshold, a corresponding change can be made to the configuration of the 3D printer. For example, if an upper and lower light intensity threshold is set for an optical sensor in at a first location within the 3D printer, if the measured light intensity by the optical sensor exceeds the upper threshold or falls below the lower threshold, a corresponding change could be made to the 3D printer configuration. As an example reconfiguration based on sensor data, if an upper limit light intensity threshold is exceeded, the amount of power provided to a light within the 3D printer could be reduced. As another example reconfiguration based on sensor data, if a sensor value falls below a lower limit light intensity threshold, the amount of power provided to a light within the 3D printer could be increased.

Various thresholds and corresponding reconfiguration actions can be implemented. For example, optical sensor thresholds can be set for light intensity and light frequency. Corresponding reconfiguration actions based on upper and lower limits for light intensity and light frequency thresholds can include light position adjustments, light intensity adjustments, light frequency adjustments, light angle adjustments, and light width adjustments. For example, if a light intensity threshold is exceeded within the chamber, a reconfiguration action can include reducing the amount of active lights, reducing intensity of one or more lights, modifying the angle of one or more lights, and/or adjusting a beam width of one or more lights. As another example, if a light intensity falls below a light intensity threshold within the chamber, a reconfiguration action can include increasing the amount of active lights, increasing intensity of one or more lights, modifying the angle of one or more lights, and/or increasing a beam width of one or more lights. As another example, if a light frequency threshold is exceeded within the chamber, a reconfiguration action can include reducing the amount of active lights, reducing the frequency of one or more lights, modifying the angle of one or more lights, and/or adjusting a beam width of one or more lights. As another example, if a measured light frequency falls below a light frequency threshold, a reconfiguration action can include increasing the amount of active lights, increasing the frequency of one or more lights, modifying the angle of one or more lights, and/or adjusting a beam width of one or more lights.

The above-mentioned light frequency and intensity thresholds can also be used to reconfigure mirrors within the 3D printer. For example, light intensity and/or light frequency measurements falling below or exceeding thresholds can lead to the following reconfiguration actions: repositioning a mirror, adding a mirror, removing a mirror, modifying an angle of a mirror, and/or changing a mirror type.

Thresholds can also be set for positional requirements of components within the system. For example, if a position of a particular component (e.g., a mirror or light source) within the system exceeds a distance threshold (e.g., the position of a component is offset by a particular distance), then a reconfiguration action can be issued to reposition one or more components within the 3D printer.

Thresholds can also be set based on characteristics of the photosensitive material. For example, light-based 3D printing may require specific pH and/or temperature conditions for the fluid containing the photosensitive material. As such, if a measured pH or temperature falls below or exceeds a pH or temperature threshold, a reconfiguration action could include altering a temperature and/or pH of the fluid within the chamber. In some embodiments, a warning could be presented on a graphical user interface (GUI) associated with a 3D printer indicating that the conditions are not proper for light-based 3D printing. In some embodiments, 3D printing can be temporarily paused until the conditions for light-based 3D printing are proper.

If determination is made that a condition is met for reconfiguring the 3D printer, then the 3D printer is reconfigured. This is illustrated at operation 335. This can include modifying lighting and/or mirror characteristics of the systems as discussed above. This can also include modifying the fluid containing the photosensitive material. After the 3D printer is reconfigured at operation 335, or after a determination is made that a condition for reconfiguration is not met, then the 3D printing process finishes. This is illustrated at operation 340. Finishing the 3D printing process can include, without limitation, providing power to the light sources of the system until an object forms within the photosensitive material. Upon providing sufficient light exposure to form the object, the object can be removed from the 3D printer and post-processing (e.g., sanding, painting, coating, etc.) of the object can occur.

The aforementioned operations can be completed in any order and are not limited to those described. Additionally, some, all, or none of the aforementioned operations can be completed, while still remaining within the spirit and scope of the present disclosure.

Figure 4:
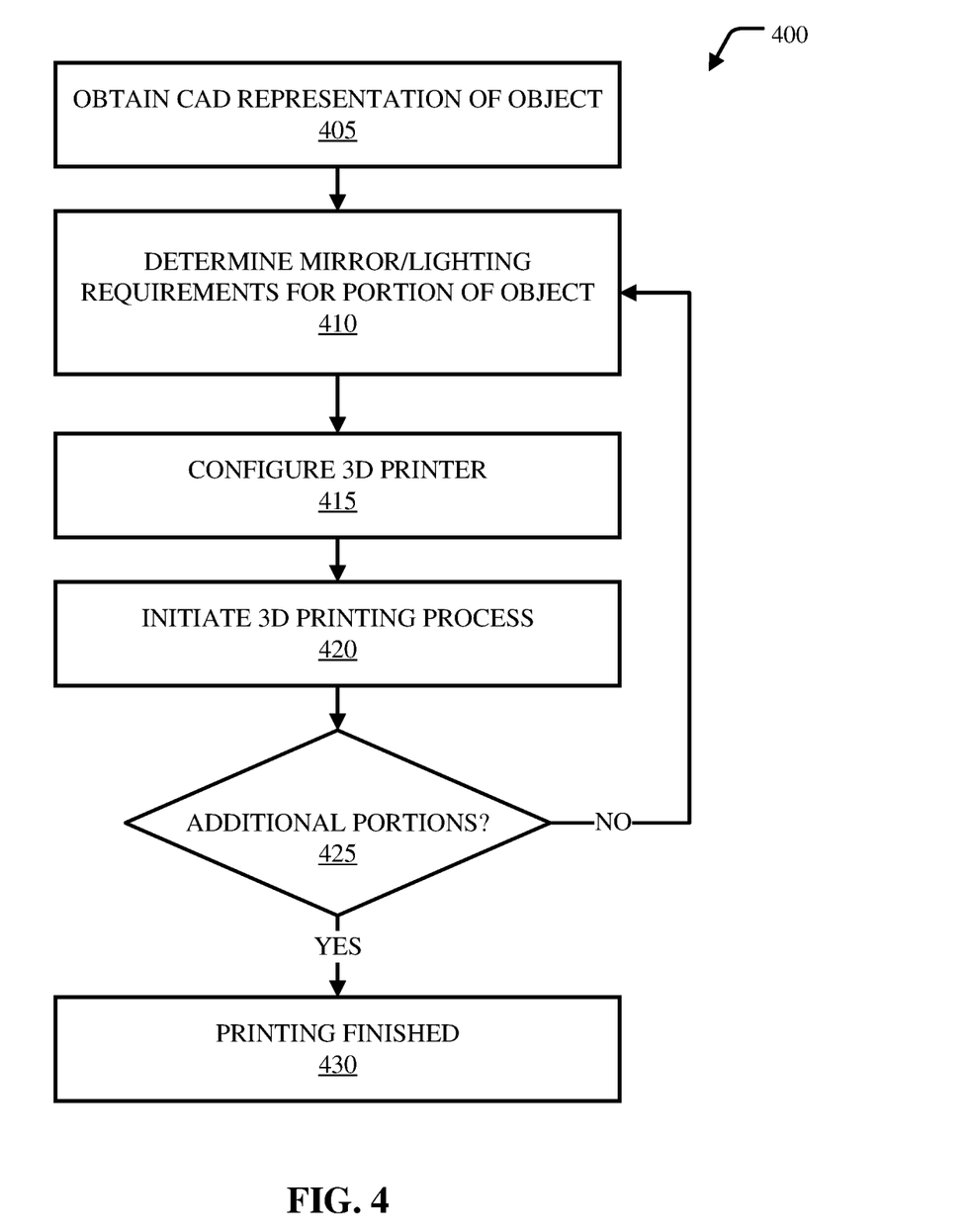
FIG. 4 is a flow-diagram illustrating another example method for light-based 3D printing, in accordance with embodiments of the present disclosure.

Referring now to FIG. 4, shown is an example method 400 for light-based 3D printing, in accordance with embodiments of the present disclosure. Operations described in FIG. 4 can be completed by one or more processing circuits of a computer system and/or 3D printer (e.g., computer 105, 3D printer 130, and 3D printer 200).

Method 400 initiates at operation 405, where a CAD representation of an object is received. Operation 405 can be completed the same as, or substantially similar to, operation 305 of FIG. 3. For example, the CAD representation of the object can be received from or generated within a modeling application.

Mirror and/or lighting requirements for a first portion of an object are then determined. This is illustrated at operation 410. Operation 410 can be completed the same as, or substantially similar to, operation 310 of FIG. 3. However, in FIG. 4, the mirror and/or lighting requirements may only be suitable to print a portion of an object, as the object may require multiple iterations of printing to be fully formed.

The 3D printer is then configured based on the mirror and/or lighting requirements. This is illustrated at operation 415. Thus, the configuration (e.g., position, number, type, angle, etc.) of the light sources and mirrors within the 3D printer can be adjusted such that the photosensitive material is exposed to light in a manner such that the CAD representation of the object can be printed. The configuration can be adjusted based on control signals issued from a computer to one or more actuators associated with the 3D printer.

The 3D printing process then initiates. This is illustrated at operation 420. Operation 420 can be completed the same as, or substantially similar to, operation 320 of FIG. 3. For example, power can be provided to one or more light source(s) within the 3D printer such that the photosensitive material is exposed to light in a controlled manner.

A determination is then made whether there are additional portions of the objects to be printed. This is illustrated at operation 425. If there are additional portions (e.g., subparts, layers, portions which cannot be printed in a single iteration, etc.) of the object which require printing, then mirror and/or lighting requirements for a next portion of the object to be printed are determined. Thus, operation 425 returns to operation 410 where the next mirror and/or lighting requirements are determined. Operations 410-425 can continue to loop until all portions of an object are printed. If a determination is made that no additional portions require printing, then printing is finished at operation 430. Post-processing can then be completed such that the object is finished (e.g., sanded, cured, painted, coated, etc.) and the portions of the object are joined (e.g., glued, fused, assembled, etc.) together.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
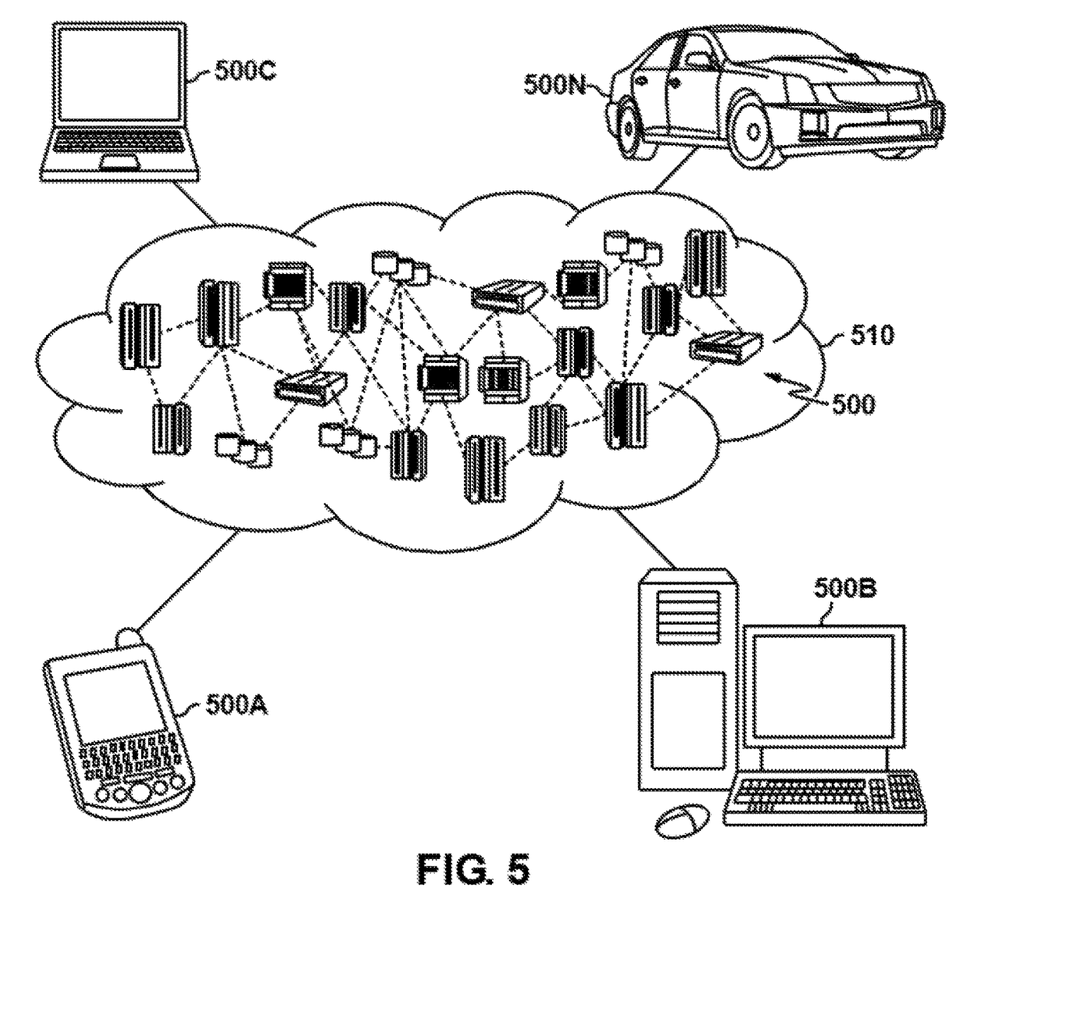
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B (e.g., computer 105) laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
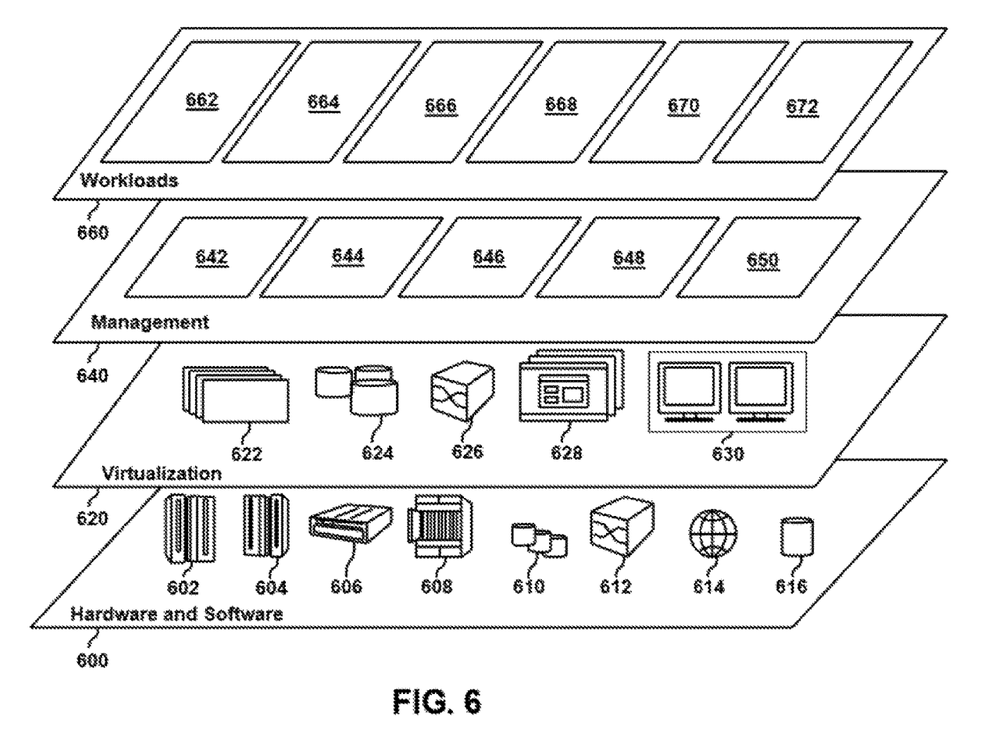
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 may allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; modeling 670; and light-based 3D printing management 672.

Figure 7:
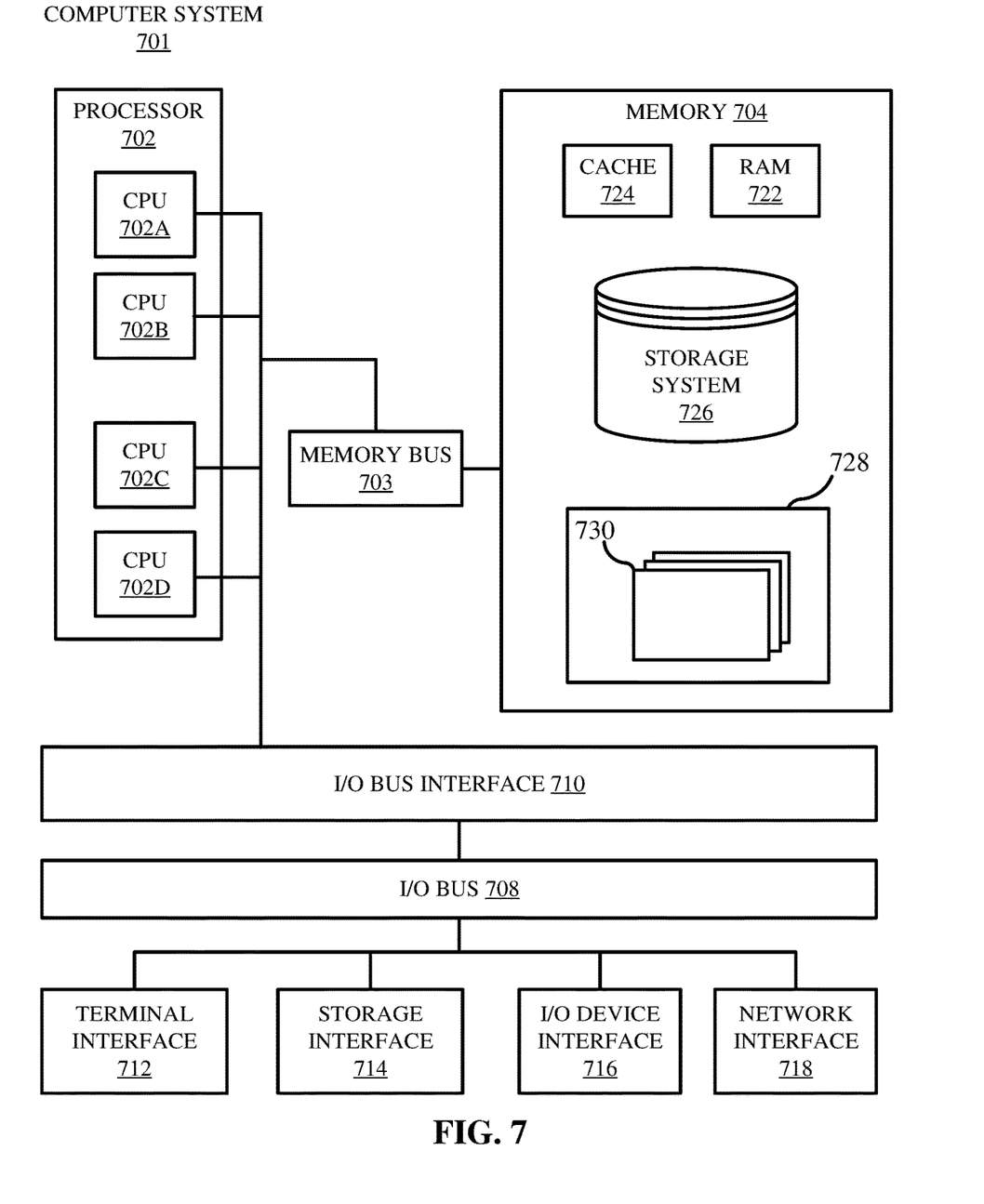
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., computer 105, 3D printer 130, 3D printer 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:

obtaining a computer aided design (CAD) representation of an object;

determining mirror and lighting requirements of a light-based 3D printer based on the CAD representation of the object, the light-based 3D printer including a chamber, a liquid container within the chamber, and at least one mirror and at least one light source within the chamber, the liquid container containing a photosensitive material, and one or more sensors to measure a process characteristic(s) within the liquid container;

adjusting mirror and lighting characteristics of the at least one mirror and the at least one light source within the chamber based on the determined mirror and lighting requirements, the adjusting resulting in a first configuration of the light-based 3D printer;

initiating a 3D printing process, wherein initiating the 3D printing process includes exposing the photosensitive material in the liquid container within the light-based 3D printer to light based on the first configuration of the light-based 3D printer and monitoring sensor data from the one or more sensors within the liquid container, the photosensitive material transitioning from a liquid into at least a portion of the object with the exposing to the light;

receiving, during the 3D printing process, the sensor data from the one or more sensors within the liquid container in the chamber of the light-based 3D printer;

determining whether a condition for reconfiguring the light-based 3D printer is met based on a sensor data threshold;

reconfiguring, in response to determining that the condition for reconfiguring the light-based 3D printer is met, the light-based 3D printer, wherein reconfiguring the light-based 3D printer includes adjusting lighting and mirror characteristics of the at least one mirror and the at least one light source within the chamber a second time; and wherein the sensor data threshold is a light intensity threshold of light passing through the photosensitive material within the liquid container, and wherein the reconfiguring the light-based 3D printer includes altering an intensity of the at least one light source within the chamber of the light-based 3D printer.

2. The method of claim 1, wherein the sensor data threshold is a light intensity threshold of light passing through the photosensitive material within the liquid container, wherein reconfiguring the light-based 3D printer includes repositioning the at least one mirror within the chamber of the light-based 3D printer.

3. The method of claim 1, further comprising:
- determining that a second portion of the object requires printing;
- determining a second set of mirror and lighting requirements for the light-based 3D printer to print the second portion of the object;
- adjusting lighting and mirror characteristics of the at least one mirror and the at least one light source within the chamber based on the determined second set of mirror and lighting requirements, the adjusting resulting in a second configuration of the light-based 3D printer; and
- initiating a second 3D printing process, wherein initiating the second 3D printing process includes exposing the photosensitive material in the liquid container within the light-based 3D printer to light based on the second configuration of the light-based 3D printer to transition the photosensitive material into the second portion of the object.

4. The method of claim 3, wherein adjusting the lighting and mirror characteristics includes at least adjusting a position and angle of the at least one mirror and the at least one light source within the chamber for the second configuration of the 3D printer.

5. A computer program product comprising one or more computer readable storage media, and program instructions collectively stored on the one or more computer readable storage media, the program instructions comprising instructions configured to cause one or more processors to perform a method comprising:
- obtaining a computer aided design (CAD) representation of an object;
- determining mirror and lighting requirements of a light-based 3D printer based on the CAD representation of the object, the light-based 3D printer including a chamber, a liquid container within the chamber, and at least one mirror and at least one light source within the chamber, the liquid container containing a photosensitive material, and one or more sensors to measure a process characteristic(s) within the liquid container;
- adjusting mirror and lighting characteristics of the at least one mirror and the at least one light source within the chamber based on the determined mirror and lighting requirements, the adjusting resulting in a first configuration of the light-based 3D printer;
- initiating a 3D printing process, wherein initiating the 3D printing process includes exposing the photosensitive material in the liquid container within the light-based 3D printer to light based on the first configuration of the light-based 3D printer and monitoring sensor data from the one or more sensors within the liquid container, the photosensitive material transitioning from a liquid into at least a portion of the object with the exposing to the light;
- receiving, during the 3D printing process, the sensor data from the one or more sensors within the liquid container in the chamber of the light-based 3D printer;
- determining whether a condition for reconfiguring the light-based 3D printer is met based on a sensor data threshold;
- reconfiguring, in response to determining that the condition for reconfiguring the light-based 3D printer is met, the light-based 3D printer, wherein reconfiguring the light-based 3D printer includes adjusting lighting and mirror characteristics of the at least one mirror and the at least one light source within the chamber a second time; and
- wherein the sensor data threshold is a light intensity threshold of light passing through the photosensitive material within the liquid container, and wherein the reconfiguring the light-based 3D printer includes repositioning at least one light source within the chamber of the light-based 3D printer, and reducing the intensity of at least one light source within the chamber of the light-based 3D printer.

6. The computer program product of claim 5, wherein the sensor data threshold is a light intensity threshold of light passing through the photosensitive material within the liquid container, wherein reconfiguring the light-based 3D printer includes repositioning the at least one mirror within the chamber of the light-based 3D printer.

7. The computer program product of claim 5, wherein the method performed by the one or more processors further comprises:
- determining that a second portion of the object requires printing;
- determining a second set of mirror and lighting requirements for the light-based 3D printer to print the second portion of the object;
- adjusting lighting and mirror characteristics of the at least one mirror and the at least one light source within the chamber based on the determined second set of mirror and lighting requirements, the adjusting resulting in a second configuration of light-based 3D printer; and
- initiating a second 3D printing process, wherein initiating the second 3D printing process includes exposing the photosensitive material in the liquid container within the light-based 3D printer to light based on the second configuration of the light-based 3D printer to transition the photosensitive material into the second portion of the object.

8. The computer program product of claim 7, wherein adjusting the lighting and mirror characteristics includes adjusting a position and angle of the at least one mirror and the at least one light source within the chamber for the second configuration of the 3D printer.

9. The computer program product of claim 8, wherein adjusting the lighting and mirror characteristics further includes adjusting an intensity and frequency of the at least one light source within the chamber for the second configuration of the 3D printer.

10. The computer program product of claim 8, wherein the light-based 3D printer includes multiple mirrors within the chamber, the at least one mirror being at least one mirror of the multiple mirrors, and the adjusting the lighting and mirror characteristics for the second configuration of the 3D printer further includes removing one or more mirrors of the multiple mirrors from the chamber of the light-based 3D printer.

* * * * *